United States Patent [19]

Ghosh et al.

[11] Patent Number: 5,621,665
[45] Date of Patent: Apr. 15, 1997

[54] SELECTING LEVELS FOR FACTORS FOR INDUSTRIAL PROCESS EXPERIMENTS

[75] Inventors: Saki P. Ghosh, San Jose; Vijendra P. Singh, Saratoga, both of Calif.

[73] Assignee: International Business Machines Corporation, Armonk, N.Y.

[21] Appl. No.: 299,462

[22] Filed: Aug. 31, 1994

Related U.S. Application Data

[63] Continuation of Ser. No. 990,876, Dec. 15, 1992, abandoned.

[51] Int. Cl.$^6$ .................................................. G05B 13/00
[52] U.S. Cl. .......................................... 364/552; 364/148
[58] Field of Search .................................. 364/553, 554, 364/552, 578, 148, 149, 150, 151, 153, 154

[56] References Cited

U.S. PATENT DOCUMENTS 3,702,003  10/1972  Ramierez, Jr. et al. .................... 444/1

FOREIGN PATENT DOCUMENTS 2287737  11/1990  Japan .
3-9436    1/1991   Japan .

OTHER PUBLICATIONS

G. Taguchi, System of Experimental Design, Engineering Methods to Optimize Quality and Minimize Costs, *Introduction to Orthogonal Arrays*, pp. 165–182 (excerpt from book).

O. Kempthorne, The Design and Analysis of Experiments, *The Arrangement of n Factors Each with $p^m$ Levels in Blocks of $(p^m)^s$*, Chapter 17.7, pp. 331–339 (excerpt from book).

H. S. Lewandowski et al., An Automated Method for the Preparation of Orthogonal Arrays for Use in Taguchi Designed Experiments, Computers ind. Engng, vol. 17, Nos 1–4, pp. 502–507, 1989.

A. S. Hedayat et al., Final Scientific Rept. to AF Office of Scientific Res. Contract AFOSR 85–0320, *Design of Experiments and Reliability Models*. Dept. of Math. Statistics & Computer Sci., Univ. of Illinois, May 1, 1989.

W. A. Levinson, A General Linear Model for Statistically Designed Experiments, IBM Technical Report 22.2898, Feb. 1991.

D. E. Johnson, Factors to Consider when Planning an Experiment, Proceedings for the 13th Annual Design of Experiments Conference, pp. 287–298, Apr. 1986.

(List continued on next page.)

*Primary Examiner*—Emanuel T. Voeltz
*Assistant Examiner*—Edward Pipala
*Attorney, Agent, or Firm*—James C. Pintner

[57] ABSTRACT

A method is provided for defining a minimally sized set of industrial process experiments which are sufficient to identify optimal levels for factors which go into the process. The method defines levels for the factors for the experiments in terms of a symmetric orthogonal array, which represents a valid Galois field for a number of levels for each factor equal to a prime number. The factors are divided into first and second groups. In accordance with Galois field theory, the required number of experiments is a number sufficient to provide a complete set of permutations of levels for the first group of factors. For each experiment, the levels for the second group of factors are determined based on the levels of the first group of factors. In a preferred embodiment, level symbols which are consecutive integers ranging upward from zero are assigned to the levels for each factor. The levels for the second group of factors are computed by performing a modulo addition of the levels for the first factors, scaled by coefficients which differ for the different experiments. Interactions between factors are represented by the factors making up the interactions, and associated indices. In a second preferred embodiment, the factors which make up the interactions are assigned to the first group of factors, and the levels for the second factors are computed based on coefficients which do not correspond with the indices of the interactions.

36 Claims, 10 Drawing Sheets

OTHER PUBLICATIONS

D. G. O'Connell, Design of Experiments: A Statistical Technique for Evaluating Causes of Punching Errors in Port A Punch Devices, Proceedings for the 13th Annual Design of Experiments Conference, pp. 570–662, Apr. 1986.

K. Wong et al., ADOE: Automated Design of Experiments Systems, IBM Research Report 8666 (77754), Mar. 11, 1992.

| EXPERIMENT NO. \ FACTOR | 1 | 2 | 3 | 4 | 5 | 6 | 7 |
|---|---|---|---|---|---|---|---|
| 1 | 1 | 1 | 1 | 1 | 1 | 1 | 1 |
| 2 | 1 | 1 | 1 | 2 | 2 | 2 | 2 |
| 3 | 1 | 2 | 2 | 1 | 1 | 2 | 2 |
| 4 | 1 | 2 | 2 | 2 | 2 | 1 | 1 |
| 5 | 2 | 1 | 2 | 1 | 2 | 1 | 2 |
| 6 | 2 | 1 | 2 | 2 | 1 | 2 | 1 |
| 7 | 2 | 2 | 1 | 1 | 2 | 2 | 1 |
| 8 | 2 | 2 | 1 | 2 | 1 | 1 | 2 |

FIG. 1

| EXPERIMENTS | FACTORS | | | |
|---|---|---|---|---|
| | $F_1$ | $F_2$ | $F_3$ | $F_4$ |
| $E_1$ | 0 | 0 | 0 | 0 |
| $E_2$ | 1 | 0 | 1 | 1 |
| $E_3$ | 2 | 0 | 2 | 2 |
| $E_4$ | 0 | 1 | 1 | 2 |
| $E_5$ | 1 | 1 | 2 | 0 |
| $E_6$ | 2 | 1 | 0 | 1 |
| $E_7$ | 0 | 2 | 2 | 1 |
| $E_8$ | 1 | 2 | 0 | 2 |
| $E_9$ | 2 | 2 | 1 | 0 |

FIG. 3

|     | $F_1$ | $F_2$ | $F_3$ |
|-----|-------|-------|-------|
| $E_1$ | 0 | 0 | 0 |
| $E_2$ | 1 | 0 | 0 |
| $E_3$ | 2 | 0 | 0 |
| $E_4$ | 0 | 1 | 0 |
| $E_5$ | 1 | 1 | 0 |
| $E_6$ | 2 | 1 | 0 |
| $E_7$ | 0 | 2 | 0 |
| $E_8$ | 1 | 2 | 0 |
| $E_9$ | 2 | 2 | 0 |
| $E_{10}$ | 0 | 0 | 1 |
| $E_{11}$ | 1 | 0 | 1 |
| $E_{12}$ | 2 | 0 | 1 |
| $E_{13}$ | 0 | 1 | 1 |
| $E_{14}$ | 1 | 1 | 1 |
| $E_{15}$ | 2 | 1 | 1 |
| $E_{16}$ | 0 | 2 | 1 |
| $E_{17}$ | 1 | 2 | 1 |
| $E_{18}$ | 2 | 2 | 1 |
| $E_{19}$ | 0 | 0 | 2 |
| $E_{20}$ | 1 | 0 | 2 |
| $E_{21}$ | 2 | 0 | 2 |
| $E_{22}$ | 0 | 1 | 2 |
| $E_{23}$ | 1 | 1 | 2 |
| $E_{24}$ | 2 | 1 | 2 |
| $E_{25}$ | 0 | 2 | 2 |
| $E_{26}$ | 1 | 2 | 2 |
| $E_{27}$ | 2 | 2 | 2 |

FIG. 5B

|     | $F_1$ | $F_2$ | $F_3$ |
|-----|-------|-------|-------|
| $E_1$ | 0 | 0 | 0 |
| $E_2$ | 1 | 0 | 1 |
| $E_3$ | 2 | 0 | 2 |
| $E_4$ | 0 | 1 | 2 |
| $E_5$ | 1 | 1 | 0 |
| $E_6$ | 2 | 1 | 1 |
| $E_7$ | 0 | 2 | 1 |
| $E_8$ | 1 | 2 | 2 |
| $E_9$ | 2 | 2 | 0 |

FIG. 5A

| EXPT. NO. | 1 A | 2 B | 3 A B | 4 A B² | 5 C | 6 A C | 7 D | 8 B C | 9 A A C | 10 E | 11 F | 12 G | 13 H |
|---|---|---|---|---|---|---|---|---|---|---|---|---|---|
| 1  | 1 | 1 | 1 | 1 | 1 | 1 | 1 | 1 | 1 | 1 | 1 | 1 | 1 |
| 2  | 1 | 1 | 1 | 1 | 2 | 2 | 2 | 2 | 2 | 2 | 2 | 2 | 2 |
| 3  | 1 | 1 | 1 | 1 | 3 | 3 | 3 | 3 | 3 | 3 | 3 | 3 | 3 |
| 4  | 1 | 2 | 2 | 2 | 1 | 1 | 1 | 2 | 2 | 2 | 3 | 3 | 3 |
| 5  | 1 | 2 | 2 | 2 | 2 | 2 | 2 | 3 | 3 | 3 | 1 | 1 | 1 |
| 6  | 1 | 2 | 2 | 2 | 3 | 3 | 3 | 1 | 1 | 1 | 2 | 2 | 2 |
| 7  | 1 | 3 | 3 | 3 | 1 | 1 | 1 | 3 | 3 | 3 | 2 | 2 | 2 |
| 8  | 1 | 3 | 3 | 3 | 2 | 2 | 2 | 1 | 1 | 1 | 3 | 3 | 3 |
| 9  | 1 | 3 | 3 | 3 | 3 | 3 | 3 | 2 | 2 | 2 | 1 | 1 | 1 |
| 10 | 2 | 1 | 2 | 3 | 1 | 2 | 3 | 1 | 2 | 3 | 1 | 2 | 3 |
| 11 | 2 | 1 | 2 | 3 | 2 | 3 | 1 | 2 | 3 | 1 | 2 | 3 | 1 |
| 12 | 2 | 1 | 2 | 3 | 3 | 1 | 2 | 3 | 1 | 2 | 3 | 1 | 2 |
| 13 | 2 | 2 | 3 | 1 | 1 | 2 | 3 | 2 | 3 | 1 | 3 | 1 | 2 |
| 14 | 2 | 2 | 3 | 1 | 2 | 3 | 1 | 3 | 1 | 2 | 1 | 2 | 3 |
| 15 | 2 | 2 | 3 | 1 | 3 | 1 | 2 | 1 | 2 | 3 | 2 | 3 | 1 |
| 16 | 2 | 3 | 1 | 2 | 1 | 2 | 3 | 3 | 1 | 2 | 2 | 3 | 1 |
| 17 | 2 | 3 | 1 | 2 | 2 | 3 | 1 | 1 | 2 | 3 | 3 | 1 | 2 |
| 18 | 2 | 3 | 1 | 2 | 3 | 1 | 2 | 2 | 3 | 1 | 1 | 2 | 3 |
| 19 | 3 | 1 | 3 | 2 | 1 | 3 | 2 | 1 | 3 | 2 | 1 | 3 | 2 |
| 20 | 3 | 1 | 3 | 2 | 2 | 1 | 3 | 2 | 1 | 3 | 2 | 1 | 3 |
| 21 | 3 | 1 | 3 | 2 | 3 | 2 | 1 | 3 | 2 | 1 | 3 | 2 | 1 |
| 22 | 3 | 2 | 1 | 3 | 1 | 3 | 2 | 2 | 1 | 3 | 3 | 2 | 1 |
| 23 | 3 | 2 | 1 | 3 | 2 | 1 | 3 | 3 | 2 | 1 | 1 | 3 | 2 |
| 24 | 3 | 2 | 1 | 3 | 3 | 2 | 1 | 1 | 3 | 2 | 2 | 1 | 3 |
| 25 | 3 | 3 | 2 | 1 | 1 | 3 | 2 | 3 | 2 | 1 | 2 | 1 | 3 |
| 26 | 3 | 3 | 2 | 1 | 2 | 1 | 3 | 1 | 3 | 2 | 3 | 2 | 1 |
| 27 | 3 | 3 | 2 | 1 | 3 | 2 | 1 | 2 | 1 | 3 | 1 | 3 | 2 |
|    | a | b | a b | a b² | c | a c | a c² | b c | a b c | a b c² | b c² | a b² c | a b² c² |

FIG. 6

| FACTORS | LEVELS | 1 | 2 | 3 |
| --- | --- | --- | --- | --- |
| A. CURRENT DENSITY | 3 | 6 | 7 | 8 |
| B. BATH TEMP (C Deg.) | 3 | 27 | 33 | 45 |
| C. BATH CONC. (grms/lit. Ni) | 3 | 12 | 18 | 24 |
| D. COMPOSITION (% Ni) | 3 | 82 | 83 | 84 |
| E. H-FIELD (Oe) | 3 | 900 | 2200 | 4500 |
| F. P1-THICKNESS | 3 | 0.7 | 0.9 | 1.2 |
| G. GAP | 3 | 0.6 | 0.8 | 0.9 |
| H. P2-THICKNESS | 3 | 0.7 | 0.95 | 1.2 |

FIG. 7

```
MAIN
[0]  Z←L MAIN F;J;M;R;LV
[1]  ⍝ GENERATE MAIN EFFECTS FOR L-LEVELS AND F-FACTORS
[2]  →(L<2)/'L SHOULD BE ≥2'
[3]  R←L*F              ⍝ NO. OF ROWS IN M
[4]  M←(R,F)⍴0          ⍝ INITIALIZE M
[5]  LV←⁻1+⍳L           ⍝ SPECIFY LEVELS
[6]  J←1
[7]  LOOP:M[;J]←R⍴,⌽((L*J-1),L)⍴LV   ⍝ GENERATE COLUMN J IN M
[8]  →(F≥J←J+1)/LOOP
[9]  Z←M
```

FIG. 8A

```
PATTERN
[0]    Z←L PATTERN F;C;J;V;L1;M1;C1;C2;PM
[1]    ⍝GENERATE PATTERN MATRIX FOR MAIN AND INTERACTION EFFECTS
[2]    ⍝L = LEVELS AND F = FACTORS
[3]    C←(¯1+L*F)÷L-1          ⍝NO. OF COLUMNS IN M (ROWS IN PATTERN MATRIX)
[4]    PM←(1,F)⍴((F-1)⍴0),1    ⍝ PATTERN MATRIX INITIALIZATION
[5]    J←1
[6]    LOOP:C1←(((L1←L*J),1)⍴1 ⍝CREATE A COLUMN OF UNITY
[7]    M1←C1,0V←L MAIN J       ⍝ PAD UNITY COLUMN TO PATTERNS FROM MAIN PR
[8]    →(0=C2←F-1⌊⍴M1)/END     ⍝ TEST FOR GENERATING ALL COLUMNS
[9]    M1←((L1,C2)⍴0),M1       ⍝ PAD ZERO COLUMNS TO THE PATTERN MATRIX
[10]   END:PM←PM,[1]M1         ⍝ EXTEND PATTERN MATRIX FOR EACH J VALUE
[11]   →(F>J←J+1)/LOOP         ⍝ CONTINUE LOOP FOR ALL J =1,2,...F-1
[12]   Z←PM                    ⍝ ENTIRE PATTERN MATRIX
```

```
ARRAY  Z←L ARRAY F;A;C;J;M;R;MM;PM
[0]    ⍝GENERATE ORTHOGONAL ARRAYS FOR PRIME NO. LEVELS - SYMMETRIC DESIGN
[1]    ⍝CALLS FOR MAIN AND PATTERN PROGRAMS
[2]    ⍝L = LEVELS (PRIME NOS.), F = FACTORS (ANY POSITIVE INTEGER)
[3]    R←L*F                ⍝ NO. OF ROWS IN OA
[4]    C←(¯1+L*F)÷L-1       ⍝ NO. OF COLUMNS IN OA
[5]    A←(R,C)⍴0            ⍝ INITIALIZE OA
[6]    J←1
[7]    M←L MAIN F           ⍝ GENERATE MAIN EFFECT COLUMNS
[8]    PM←L PATTERN F       ⍝GENERATE PATTERNS FOR ALL MAIN AND INTERACTION EFFECTS
[9]    LN:MM←(⍴M)⍴PM[J;]    ⍝ CREATE M SIZE MATRIX FOR FIRST ROW OF PM
[10]   A[;J]←LI(+/MM×M)     ⍝MULTIPLY BOTH M AND MM AND TAKE MODULO PRIME LEVEL
[11]   →(C≥J←J+1)/LN        ⍝ REPEAT FOR ALL PATTERN ROWS
[12]   Z←A+1                ⍝ ORTHOGONAL ARRAY
```

5,621,665

SELECTING LEVELS FOR FACTORS FOR INDUSTRIAL PROCESS EXPERIMENTS

This is a continuation of application Ser. No. 07/990,876 filed on Dec. 15, 1992 now abandoned.

FIELD OF THE INVENTION

The present invention generally relates to the field of optimization of industrial processes. More specifically, the invention relates to a method for designing experiments, in terms of different combinations of levels for various factors involved in an industrial process, to determine levels which produce optimal results.

BACKGROUND OF THE INVENTION

To begin the discussion of the background of the invention, certain terms will be defined, and illustrated in connection with a concrete example of an industrial process. A more elaborate discussion of the terms defined here, and a detailed analysis of the field of design of experiments for industrial processes, may be found in the treatise "System of Experimental Design", by Genichi Taguchi, White Plains, N.Y. and Dearborn, Mich.: UNIPUB/Kraus International Publications (1987).

Industrial processes have a wide variety or objectives. A common objective is to mass-produce a product. For instance, an industrial process could be for the manufacture are magnetic heads.

In an industrial process, there will likely be various reactors which influence the outcome are the process. For instance, in the magnetic head manufacturing process, various factors could include the desired current density the head can carry, a temperature for a chemical bath in which the heads being manufactured are immersed, the chemical makeup of the bath, the composition of the head material, the magnetic field the head is to produce, the physical dimensions of the head, and the gap size.

For each factor, various levels can be set. For instance, the bath temperature factor of the head manufacturing process given above could have levels such as 27°, 33°, or 45° Celsius.

The outcome of the industrial process, i.e., the quality of the final product, depends on the levels set for the various factors. In designing an industrial process, therefore, it is important to identify levels for the factors which lead to optimal or near-optimal results.

Depending on the nature of a given factor in an industrial process, variation in the level for the factor may or may not have a significant effect on the result of the process. If the level of a factor does have a significant effect, the effect is called a "main effect". Therefore, for those factors for which level variation produces a main effect, it is particularly important to select the level with the objective of optimal result in mind.

Moreover, there is a certain degree of variation in the levels for the factors in the actual process, which is impracticable to control, it is also desirable to identify levels for which such variation does not drastically reduce the quality of the output. Taguchi analyzed this variation, and used the expression "signal-to-noise ratio" (SN ratio) to refer to a measurement which is proportional to the reciprocal to the error variance. Since the error variance should be as small as possible, the SN ratio should be as large as possible.

It is also often the case that combinations of two or more factors provide a synergistic significant influence on the outcome of the process. The effect on the outcome produced by such a combination of levels for factors is called an interaction. In general, an interaction based on the levels for p+1 factors is called a p-th order interaction. Therefore, for those combinations of factors for which level variations produce an interaction, it is also important to select their levels with the objective of optimal result in mind.

When an industrial process is being developed, levels for the various factors are conventionally determined empirically. That is, experiments are run in which various levels are set for the factors, and the outcomes of the experiments are compared to determine which levels for the factors produce optimal results. Experiments are defined in terms of levels for each of the factors. The levels are selected based on criteria such as prior knowledge of a general range of levels which are likely to produce near optimal results. The selection of levels outside such a range will increase the number of experiments, without adding appreciably to the value of the experimental results. However, it is important to include levels within the desired range, so that results will give a good indication of where, within the desired range, the best level lies. After the experiments have been run, the results are compared to determine which levels produced the best results.

There may be a single combination of levels which produces results much better than any other combination of levels, or there may be a number of combinations which produce comparably good results. That is to say, the SN ratio varies from one industrial process to another. Where changing levels produces relatively little change in results, other criteria such as cost or convenience may be used to determine which combination of levels should be used. When levels which lead to optimal results are identified from the experimental results, the factors are set to those levels, and mass production is begun.

Taguchi provided a method for defining experiments using orthogonal arrays. The use of orthogonal arrays provides a method for representing a set of experiments which is convenient to create and manipulate. An orthogonal array is, essentially, a two-dimensional array of level symbols, in which one dimension (i.e., rows) represents a set of industrial process experiments to be performed, and the other dimension (i.e., columns) represents the factors of the process whose levels are to be manipulated in the experiments being defined. Each element of the array, therefore, is a level for a given one of the factors in a given one of the experiments. While levels can be expressed in terms of their own particular values and units of measure. Taguchi expressed in terms of level symbols. In particular, Taguchi used, as level symbols, integers starting with one and ascending.

An example of an orthogonal array is provided in FIG. 1, which is a reproduction of Table 6.1 on page 166 of Taguchi. FIG. 1 defines eight experiments, designated by the numbers 1 through 8 along the left column. The experiments are defined in terms of seven factors, designated 1 through 7 along the top row. For each position of the orthogonal array, a level for a given factor in a given experiment is designated. In this orthogonal array, there are two levels for each factor. While the natures of the factors and the specific values assigned to the levels vary, the selected two levels for each factor are designated by level symbols, shown as the numbers 1 and 2. It is to be understood that the level symbols represent levels according to the particular nature of the factors. For instance, for a factor representing a temperature utilized in the process, the level symbols 1 and 2 represent two different temperature levels. For another factor representing a length of time for a given step of the process, the level symbols 1 and 2 represent two different lengths of time, and so forth. The level symbols are arbitrarily assigned to the factor levels, i.e., there is no requirement that ascending level symbol integers correspond with ascending factor levels, descending factor levels, etc.

Orthogonality, with respect to arrays which define industrial experiments, is defined by Taguchi as follows. For any two columns, representing any two of the factors, it is true that all possible ordered pairs of level symbols are represented in equal numbers over the eight defined experiments. For instance, for factors 1 and 7, the first and fourth experiments use the ordered pair of levels (1, 1), the second and third experiments use the ordered pair of levels (1, 2), the sixth and seventh experiments use the ordered pair of levels (2, 1), and the fifth and eighth experiments use the ordered pair of levels (2, 2). Each of the four possible ordered pairs of levels occur in two of the experiments. The same is true for all of the other possible pairs of factors. Therefore, the array is orthogonal. An orthogonal array is additionally described as symmetric if, as shown in FIG. 1, each of the factors has the same number of levels.

Experimentation based on experiments defined in an orthogonal array provide results which are well suited for identifying optimal levels. Because of the property of orthogonality, a given variance in results between experiments may be analyzed in terms of the variation in levels for the different factors, and those factors which are particularly critical in determining the result can be identified. If, on the other hand, the array were non-orthogonal, it would be more difficult to draw a correlation between the results and the levels for the various factors.

Interactions between factors, as well as manifestations of the factors themselves, can influence which levels for the factors produce optimal results in the industrial process. However, an interaction between two or more factors, each of which is separately given in the orthogonal array, is constrained by the values already assigned to the factors making up the interaction.

In an experimental method in which experiments are defined in terms of levels for factors, there is a drawback, in that a very large number of combinations of levels for all of the factors must be tried before optimal levels can be determined. In the worst case, the total number of experiments equals the product of the numbers of possible levels for all of the factors which go into the process. It is desirable to identify levels for the process factors which produce optimal results while minimizing the total number of experiments which must be performed, in order to save time and cost.

Therefore, it is possible to select a subset of all of the possible permutations for levels for the factors in an industrial process. In FIG. 1, for instance, there are a total of $2^7$ or 128 possible permutations of levels for the seven factors having two levels each. However, FIG. 1 is a subset of only eight of the permutations. However, Taguchi does not provide an analytical method for determining when a subset of the total number of permutations of levels defines a set of experiments sufficient to determine the optimum levels for the factors of the industrial process. Therefore, while FIG. 1 is an example of such a subset, it does not show a full set of designed experiments for the industrial process it illustrates.

Another example of the use of orthogonal arrays in the design of experiments in industrial processes is given in Lewandowski et al., "An Automated Method for the Preparation of Orthogonal Arrays for Use in Taguchi Designed Experiments", Computers ind. Engng, Vol. 17, Nos. 1–4, (1989), pp. 502–7. Lewandowski discusses the construction of orthogonal arrays for defining experiments, and covers cases involving mixed level factors (factors having different numbers of levels) and involving interactions. Lewandowski provides a teaching of the general concept of creating an orthogonal array in terms of assigning particular factors to columns. More specifically, on p. 503, lines 36–7 and p, 503, line 50 through p. 504, line 6, it is stated that a factor involved in the greatest number of interactions is placed in column 1, and factors which interact with it are "placed in the appropriate interaction columns . . . based on hueristic rules of interaction."

However, Lewandowski also does not provide a teaching of a method for defining the levels for each of the factors in each of a set of experiments with any certainty that a minimum necessary number of experiments are produced for obtaining experimental results which determine the optimum levels for the factors. Therefore, there remains an unsatisfied need for a method for designing a set of experiments for an industrial process which provides a satisfactory analysis of what levels for the factors give optimal results, but which does not include an unnecessarily large number of experiments.

SUMMARY OF THE INVENTION

In order to overcome the above drawbacks with conventional methods for designing industrial process experiments in orthogonal array form, there is provided in accordance with the invention a method for designing a set of experiments for determining optimal levels for factors in an industrial process based on Galois field theory, to produce a set of experiments which is sufficient in number to identify the optimal levels for the factors, but which has a theoretical minimum number.

The method of the invention includes two steps. The first step is to determine the minimum theoretical number of experiments necessary to identify the optimal levels for the factors in the process. The second step is to identify the optimal levels for the factors based on the experiments determined in the first step. The second step is executed by running the experiments, using the respective sets of factors, and obtaining experimental results, which include suitable attributes of the final product or outcome of the process. The results are then evaluated against desired attributes of the result of the process, to identify one or more sets of levels for the factors which produce results as desired.

In the first step, the experiments are defined creating a set of permutations of levels for the factors of the process. The method begins by dividing the factors of the process into first and second groups, based on the theoretical minimum number of required experiments. Each group includes an integral number of factors, at least one factor in each group. The number of factors in the first group is such that a complete set of permutations of levels for the factors in the first group produces a set of experiments sufficient to identify the optimal levels for all of the factors. In accordance with Galois field theory, all of the factors have the same number of levels, and the number of levels is a prime number.

The levels for the second group of factors are determined based on the levels for the first group of factors. This is preferably done by assigning level symbols to the levels of each of the factors. In a preferred embodiment of the invention, the level symbols are consecutive integers, starting with zero and ascending. The levels for the second group of factors are determined by computing the integers assigned thereto from the integers assigned to the levels for the first group of factors, scaled by coefficients which are variable in value from one experiment to another. The computations are preferably done in modulo arithmetic, the modulo value being the number of levels for each factor.

After the computations have been done, and the experimental levels are determined for all of the factors over all off the experiments, the experiments are performed. Based on the results of the experiments, the optimal levels for the factors may be identified.

The industrial process may be influenced by interactions between factors, as well as on the factors taken individually. In accordance with known principles of industrial process analysis, the interactions are expressed in terms of the factors involved in the interactions, and indices associated with those factors. The indices are commonly represented as integers. Therefore, a correspondence may be drawn between the indices of the interactions, and the coefficients used in the step of computing the integers for the levels of the second group of factors.

The method according to the invention is practiced, in the case where interactions as well as main effects are involved in the process, by assigning all factors involved in the interactions to the first group, and producing the complete set of permutations of levels accordingly. The levels for the second group of factors are computed based on the levels for the first factors as before, but the sets of coefficients which correspond to the indices of the interactions are not used.

As a result, the method according to the invention defines a set of experiments which meet the requirements of being minimal in number, while providing sufficient experimental results to identify the optimal levels for the factors in the industrial process. In a preferred mode for practicing the invention, the experiments are defined as an orthogonal array. The array has two dimensions which correspond with the number of experiments and the number of factors. In accordance with Taguchi, the rows of the array correspond with experiments, and the columns correspond with factors. Each column may be thought of as a vector. The coefficients used to compute the levels for the second group of factors vary from one experiment to another, in a manner which makes the vectors orthogonal.

While the invention is primarily disclosed as a method, it will be understood that an apparatus, such as a conventional data processor, including a CPU, memory, I/O, program storage, a connecting bus, and other appropriate components, could be programmed or otherwise designed to facilitate the practice of the method of the invention by designing the minumum set of experiments as per the first step of the method. Such a processor would include appropriate program means for executing the method. Also, an article of manufacture, such as a program storage device for use with a data processing system and including a storage medium and program means recorded thereon for directing the data processing system to facilitate the practice of the method of the invention, falls within the spirit and scope of the invention.

BRIEF DESCRIPTION OF THE DRAWINGS

FIG. 1 is an example of an orthogonal array representing a definition of a set of industrial process experiments.

FIG. 3 is an example of an orthogonal array produced by the method of FIG. 2.

FIG. 5A is an example of an orthogonal array produced by the method of FIGS. 4A and 4B.

FIG. 5B is another example of an orthogonal array produced by the method of FIGS. 4A and 4B.

FIG. 6 is another example of an orthogonal array produced by the method of FIGS. 4A and 4B.

FIG. 7 is a table giving definitions of the factors and levels for the industrial process for which the orthogonal array of FIG. 6 is produced by the method of FIGS. 4A and 4B.

FIG. 8 is a source listing of a software implementation of the method according to the invention.

DESCRIPTION OF THE PREFERRED EMBODIMENTS

Figure 2:
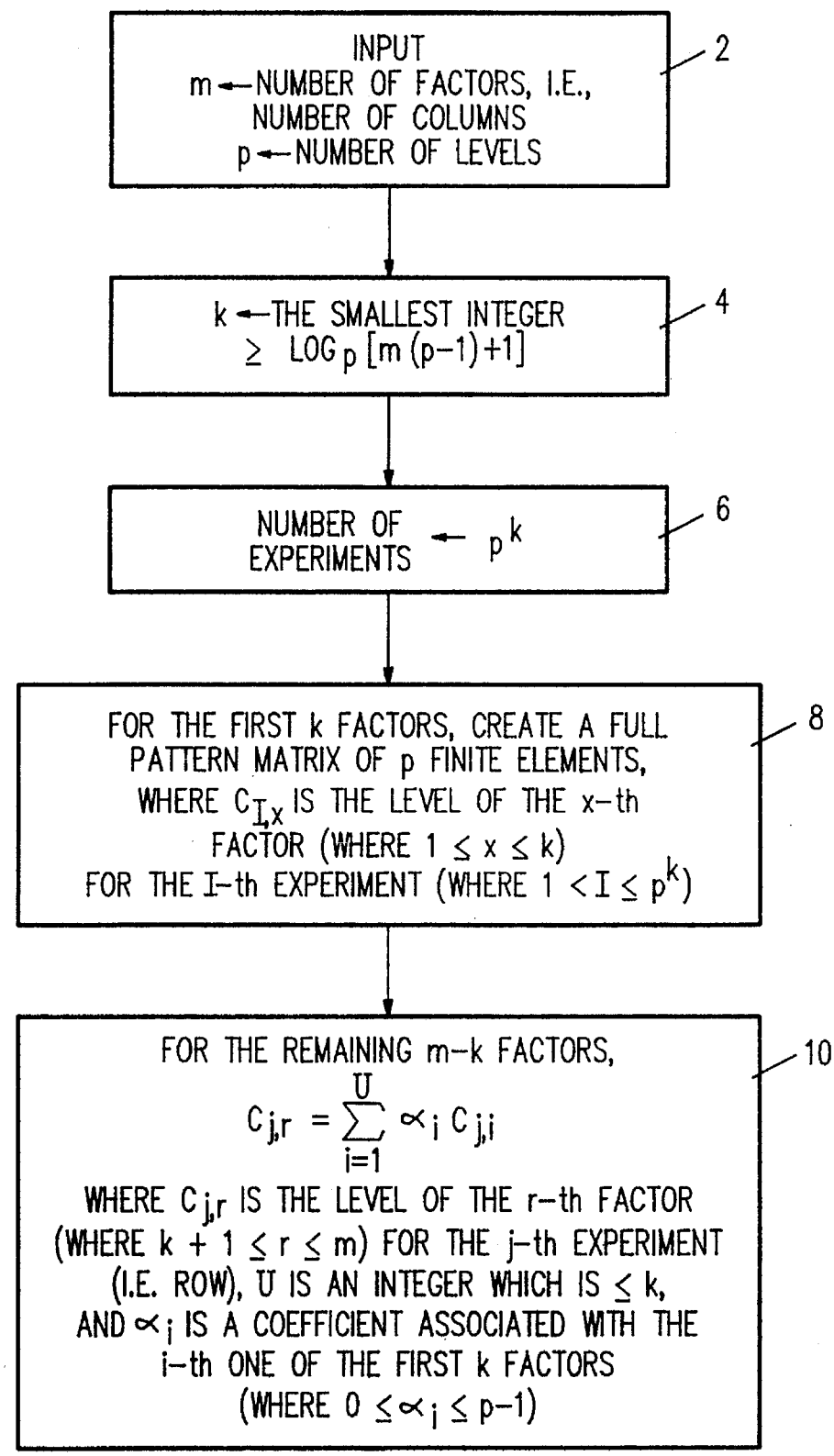
FIG. 2 is a flowchart showing a first embodiment of the method of the invention.

The invention includes a method for producing orthogonal arrays of factor levels for industrial experiments, a system for producing such orthogonal arrays, and a computer program product, for use with a data processing system, which includes a recording medium and means recorded thereon for instructing the data processing system to produce such orthogonal arrays. More specifically, the method includes the steps of determining the number of experiments to be defined, and defining levels for each of the factors in each of the experiments. The particular method by which the steps of determining and defining are carried out result in an orthogonal array which is thorough in determining optimal levels, while having an advantageously small total number of experiments.

In a first embodiment of the invention, it is assumed that only factors, no interactions, shall be determined. This first embodiment of the invention is illustrated, in flowchart form, in FIG. 2. Initially, in step 2, input parameters m and p are provided. m is the number of factors, and p is the number of levels. In accordance with the invention, the number of experiments to be defined is a number sufficient to provide all possible permutations of levels for a subset of the factors. The number of factors in the subset is designated k. Therefore, the number of experiments is $p^k$. The value of k is calculated in step 4 of FIG. 2, as the smallest integer greater than or equal to the expression $$\log_p(m(p-1)+1). \qquad (1)$$

As described, for instance, in Kempthorne, "The Design and Analysis of Experiments", Huntington, N.Y.: Robert E. Krieger Publishing Company (1973), pp. 331–9, Galois field theory is applicable to the field of process experimental design. In order for the appropriate number of experiments to be defined to identify the optimal levels for the factors, the $p^k$ experiments defined above must be a Galois field. Such a Galois field exists, under the above conditions, if p, the number of levels, is a prime number.

Given the value of k, it is determined that the orthogonal array produced by the method shall be of dimension $p^k$ by m, to define $p^k$ experiments, and specify the levels for each of the m factors for each experiment. This determination is made in step 6. In accordance with the orthogonal array format used by Taguchi, it is preferred that the orthogonal array be set up as $p^k$ rows and m columns, so that each row is an experiment, and each column is a vector of the values of a corresponding factor. This row-column convention will be used in the description which follows. However, the format may vary in accordance with the spirit and scope of the invention.

Next, in step 8, the levels for the first k factors are defined for all $p^k$ of the factors. This is done by creating a full pattern matrix of p finite elements. In other words, all possible permutations of the levels for the first k factors are defined, and one permutation is assigned to each row, i.e., each experiment. For convenience in describing the remainder of the method, a convention for naming variables is used in which the levels assigned to the first k factors are expressed in the form $C_{I,x}$, where I is the experiment ($1 \leq I \leq p^k$), and x is the factor ($1 \leq x \leq k$).

Finally, the levels are determined for the remaining m–k factors. It will be seen that, although there are enough experiments for all possible permutations of levels for the first k factors, there are not enough experiments for all possible permutations of all m factors. However, the levels the remaining m–k factors are determined so as to maintain the property of orthogonality. This is done by calculating levels for the last m–k factors based on the levels of the first k factors. A set of m–k formulas are used to make these calculations. In accordance with the invention, the set of formulas are defined so as to produce an orthogonal result.

Since, in a preferred embodiment of the invention, the levels are expressed in terms of level symbols which are integers ranging in value from 0 to p–1, modulo p arithmetic is used to maintain closure of the set of possible levels.

As shown in step 10 of FIG. 2, the formulas used are of the form $$C_{j,r} = \left( \sum_{i=1}^{U} \alpha_i \times C_{j,i} \right) \bmod p \qquad (2)$$

where $C_{j,r}$ is the level of the r-th factor ($k+1 \leq r \leq m$) for the j-th experiment ($1 \leq j \leq p^k$).

In order to define a distinct set of m–k such expressions so that the desired orthogonality results, the variable U and the coefficients $\alpha_i$, for $2 \leq i \leq U$, are chosen differently for the respective expressions for the m–k remaining factors.

In a preferred embodiment of the invention, these variables are subject to the following constraints: First, U is an integer less than or equal to k. Since U can vary for different ones of the m–k remaining factors, it can be said that U is a function of r ($k+1 \leq r \leq m$). The coefficients $\alpha_i$ vary for different ones of the m–k remaining factors. While, for a given one of the factors, some of the $\alpha_i$ may equal zero, at least two of them have non-zero values. Also, the first non-zero coefficient (i.e., where i has the smallest value) equals one.

To illustrate the operation of the first embodiment of the method of the invention, it will be explained how the method operates to generate an orthogonal array shown in FIG. 3. To begin with, there is to be generated an orthogonal array with four factors, each having three levels. Therefore, according to step 2 of FIG. 2, m is set at 4, and p is set at 3. It is thus established that, for an example in which there are no interactions but only factors, the orthogonal array to be generated will have four columns, corresponding to the four factors.

In step 4, the value of k is generated using expression (1) as follows:

$\log_p(m(p-1)+1) = \log_3(4(3-1)+1) = \log_3(9) = 2.$ k is set to the smallest integer greater than or equal to this result, i.e., k=2. Therefore, as per step 6 of FIG. 2, it is determined that the orthogonal array will have $p^k = 3^2 = 9$ rows, corresponding with nine experiments which are to be designed. In FIG. 3, the nine experiments are designated $E_1$ through $E_9$, and the four factors are designated $F_1$ through $F_4$.

The factors are divided into two groups, the first k factors, and the last m–k factors. Since k=2, the groups each include two factors. As per step 8 of FIG. 3, for the first two factors, $F_1$ and $F_2$, a complete set of permutations of levels is generated. While various particular sets of levels can satisfy this condition, in the example shown, the first factor $F_1$ has three repeated sets of the levels, i.e., (0 1 2 0 1 2 0 1 2), and the second factor $F_2$ has a constant level for each of the three sets of levels for $F_1$, i.e., (0 0 0 1 1 1 2 2 2). Therefore, orthogonality is established between these two factors.

Finally, as per step 10 of FIG. 2, the levels are calculated for the remaining two factors. For both of the factors $F_3$ and $F_4$, U equals k equals 2. Thus, for each of the factors $F_3$ and $F_4$, there will be two coefficients $\alpha_1$ and $\alpha_2$. For $F_3$, $\alpha_1=1$ and $\alpha_2=1$. For $F_4$, $\alpha_1=1$ and $\alpha_2=2$.

These values are then used, in accordance with expression (2), to calculate the levels, in level symbol form, for the remaining two factors $F_3$ and $F_4$. The results are as shown in FIG. 3. Thus, by employing a method in accordance with the invention, a symmetric orthogonal array has been created to define a set of experiments for use in determining optimal levels for optimal results in the industrial process.

A second embodiment of the invention will now be discussed, in connection with the flow chart of FIGS. 4A and 4B. The second embodiment is a method which is practiced for a more general class of experiments for industrial processes, in which interactions between factors, as well as the factors themselves, are taken into account in determining optimal levels for the factors.

Figure 4A:
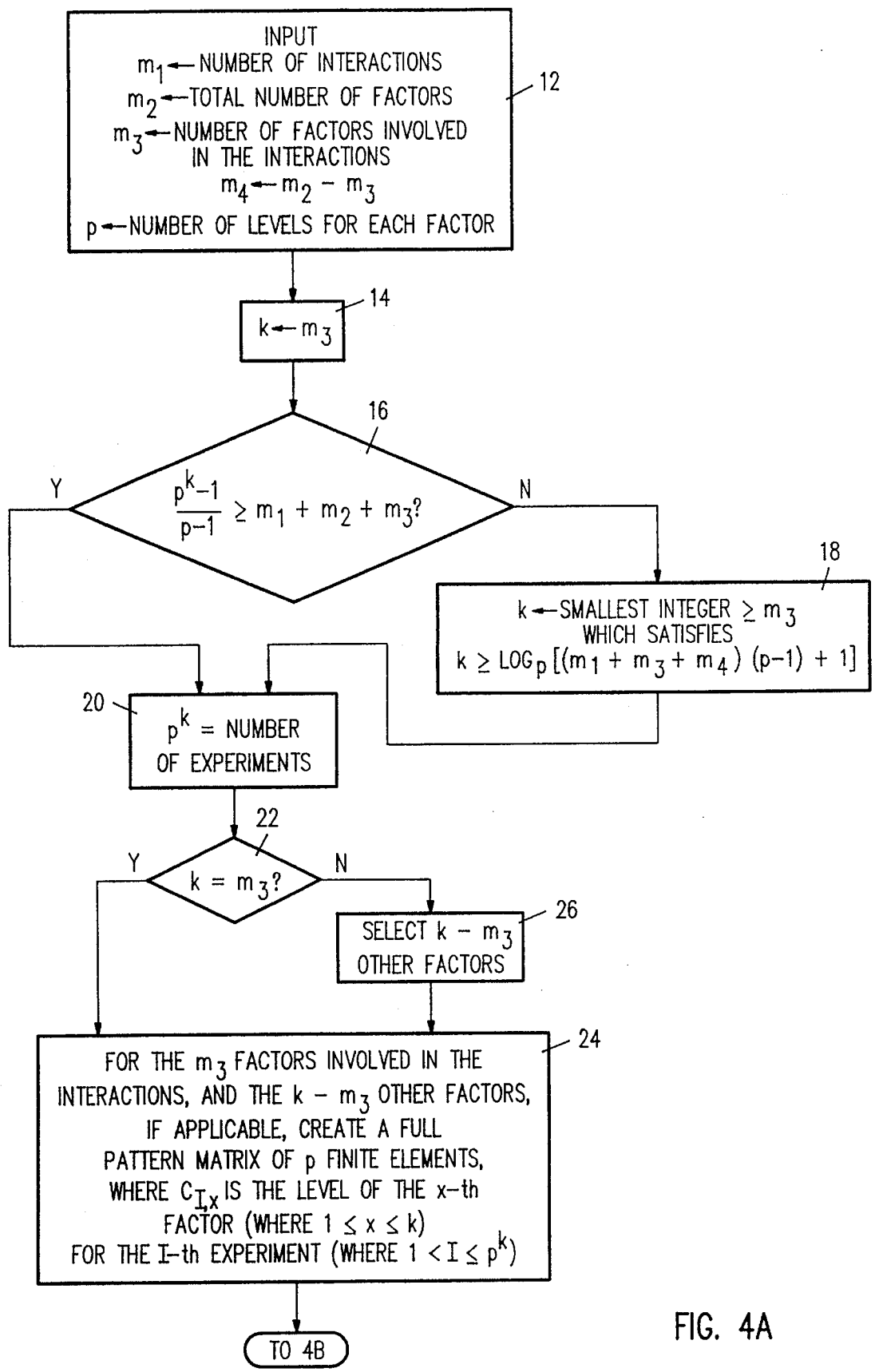
FIGS. 4A and 4B together make up a flowchart showing a second embodiment of the method of the invention.

An input step 12 in FIG. 4A corresponds with step 2 of FIG. 2. Because the orthogonal array is to be symmetric, the number p of levels for the factors is input as a constant, just as it was in step 2. An additional value, $m_1$, which is the number of interactions to be considered, is also input. However, instead of merely receiving a total number of factors m, as in step 2, step 12 receives separate values for the total number of factors $m_2$ and for the number of factors which are involved in any of the interactions to be considered. This latter value is designated $m_3$. Thus, the number $m_4$ of factors not involved in interactions is given by $m_4 = m_2 - m_3$.

The orthogonal array to be produced will have $m_2 = m_3 + m_4$ columns, i.e., one column for each of the factors. Again, the factors will be divided into a first k factors and remaining $m_2$–k factors. Also, a total of $p^k$ experiments will be defined. However, the value of k is determined differently in the second embodiment from the way it was determined in the first embodiment.

Accordingly, step 4 is replaced, in the second embodiment, by steps 14, 16, and 18. In step 14, k is provisionally set equal to $m_3$, the number of factors involved in the interactions to be considered. Then, in step 16, a test is made to determine whether $p^{m_3}$ experiments are enough to cover all of the main effects and interactions which need to be considered. This test is made by determining whether $$\frac{p^k - 1}{p - 1} \geq m_1 + m_2 + m_3. \qquad (3)$$

If this inequality is met for $k = m_3$, then setting k equal to $m_3$ (step 14) provides an adequate number of experiments (step 20).

If this inequality is not met, however, then k may need to be a larger value to provide enough experiments. Accordingly, in step 18, k is set to the smallest integer, greater than or equal to $m_3$, which satisfies the inequality $$k \geq \log_p((m_1+m_3+m_4)(p-1)+1). \quad (4)$$

It will be seen that expressions (3) and (4) are both similar in form to expression (1), which is shown in step 4 in FIG. 2. However, expression (3), shown in step 16, uses the sum of the number of interactions $m_1$, the total number of factors $m_2$, and the number of factors $m_3$ involved in the interactions, in place of the total number of factors m in expression (1). Similarly, expression (4), shown in step 18, uses the sum of the total number of factors $(m_3+m_4)$ and the number of interactions $m_1$ in place of the total number m of factors m.

After k has been set, the total number of experiments is determined, as before, by $p^k$. This is done in step 20.

The next step in the method of the second embodiment corresponds with step 8 of FIG. 2, in that a complete set of permutations of levels are given for a subset of the factors. However, there are certain differences having to do with the fact that interactions, as well as factors, are to be considered.

First, the $m_3$ factors which occur in the interactions are given the full set of permutations. Depending on the result of the test in step 16, k might equal $m_3$, or k might be greater than $m_3$. In the latter case, one or more additional factors not included in the interactions are among those given the complete set of permutations of levels.

Therefore, a test is made in step 22 to determine whether k equals $m_3$. If so, then step 24 creates the complete set of permutations for the levels of the $m_3$ factors involved in the interactions, in the same manner as step 8 of the first embodiment.

If, on the other hand, $k>m_3$, then $k-m_3$ additional factors, not involved in the interactions, are selected (step 26), and the complete set of permutations are created, for those factors as well as the $m_3$ factors involved in the interactions, in step 24.

There remains the task of calculating levels for the $m_2-k$ remaining factors not involved in the interactions. These levels are calculated based on the levels assigned in step 24, using an expression essentially the same as that of step 10 for the first embodiment. However, the coefficients are subject to additional constraints. First, instead of being less than or equal to k, the coefficient U, which limits the number of terms in expression (2), is less than or equal to $m_3$. That is, expression (2) used in the calculation only uses the levels for factors involved in the interactions, not those (if any) for which levels were set in step 24, but which are not involved in the interactions.

The second constraint is placed on the coefficients $\alpha_i$. This constraint has to do with preserving the overall orthogonality of the orthogonal array, in light of the fact that the values of the interactions are constrained by the levels of the factors which are interacting.

An interaction is denoted by the following expression:

$$\prod_{x=1}^{j} F_{ix}^{\alpha_x} \quad (5)$$

That is, for the i-th experiment, an interaction is expressed in terms of a combination of some of the first j factors of the industrial process, indexed by coefficients $\alpha_x$, where $1 \leq x \leq j$ and $\alpha_1=1$. Given this expression for an interaction, it will be seen that a formula for calculating levels for one of the remaining factors could parallel this expression for the interaction, by using coefficients, in expression (2), which equal the indices. If that were the case, then the levels for the remaining factor would, in a sense, be "contaminated" by the interaction, and not provide true orthogonality. The objective, then, is to calculate levels for a remaining factor in such a way that the level vector (i.e., the column of the array) for the remaining factor is orthogonal to that for the interaction, given the level vectors for the factors making up the interaction.

This is accomplished as follows. For each of the possible forms of expression (2), the coefficients $\alpha_i$ are compared with the indices given above, in the expression for the interactions. Only those coefficients which do not match any of the interactions are used in expression (2) to generate a level vector for any of the remaining factors. This is done repeatedly until level vectors have been calculated for all of the remaining factors.

Since the level vectors are calculated in accordance with expression (2), orthogonality is maintained, although those level vectors which would have resulted from sets of coefficients $\alpha_i$ which correspond with the indices of the interactions were not used. It will be understood that, since only a subset of the possible forms of expression (2) may be used, if a sufficiently large number of factors are involved in the industrial process, the value of k may need to be greater than $m_3$, the number of factors involved in the interactions, to provide a sufficiently large number of experiments. Thus, the test of step 16 and the alternate value assignment to k in step 18 are used.

Figure 4B:
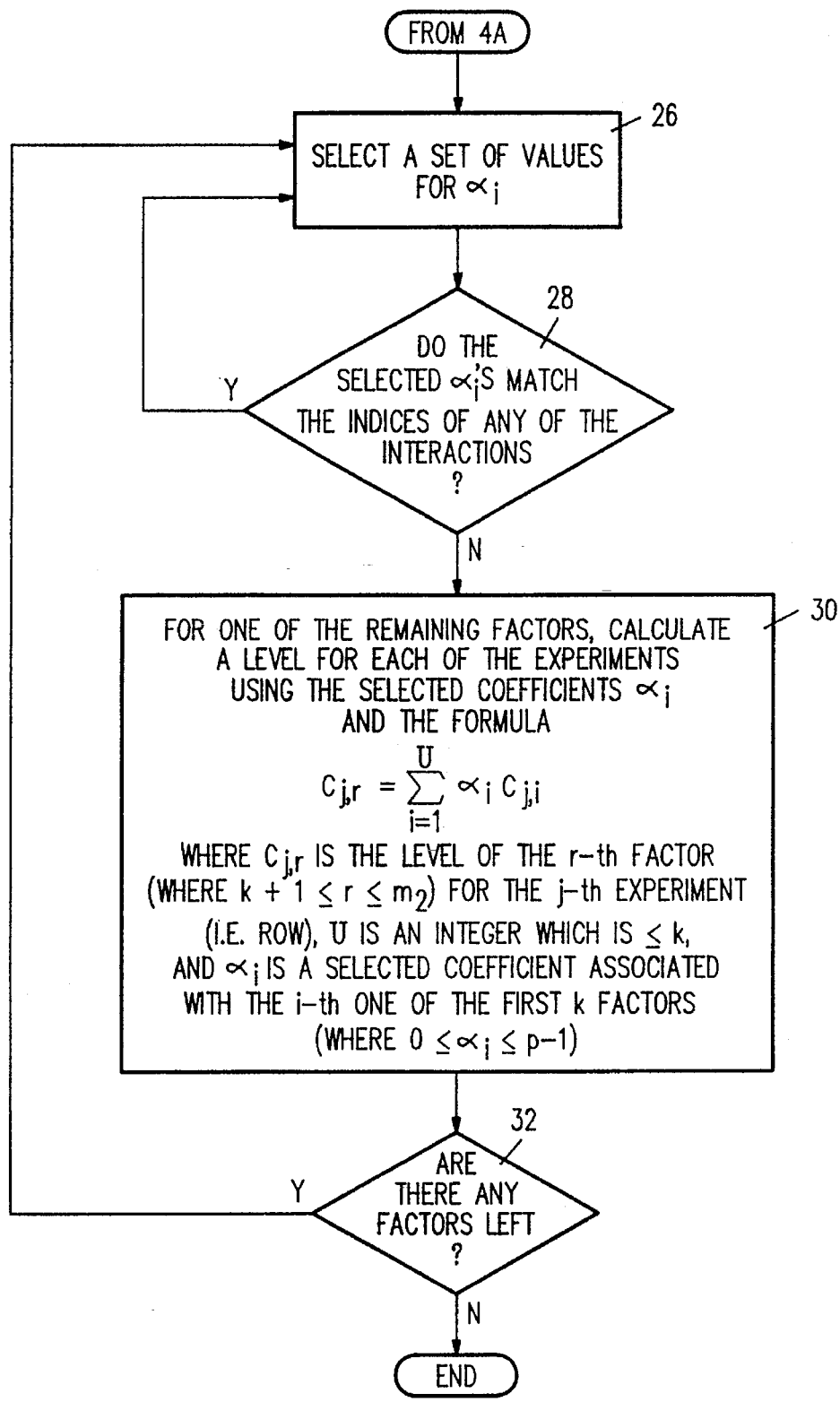

Turning now to FIG. 4B, after the levels are set for the first group of factors in step 24, levels are computed for the remaining factors. In step 26, a set of coefficients $\alpha_i$ are selected. In step 28, they are compared with the indices of the interactions. If any of the interaction indices match the selected set of coefficients, then the coefficients are discarded, and another set is selected (back to step 26). A skilled programmer will recognize that the single step 28 of FIG. 4B can be implemented as a loop test comparing the selected coefficients with each set of interaction indices, in turn, returning to step 26 if any matches are found, and dropping through if no matches with any of the interaction indices are found.

If no matches are found to disqualify the selected coefficients, the program drops through to step 30. There, a set of levels is computed for one of the remaining factors, using expression (2), just as was done in step 10 of FIG. 2. Afterward, in step 32, it is determined whether there any remaining factors left. If so, the program returns to step 26, where it again selects a set of coefficients and tests it against the interaction indices. If there are no factors left, then the orthogonal array is finished.

An example of the method according to the second embodiment of the invention will now be given. An orthogonal array of experiments having three factors, $F_1$, $F_2$, and $F_3$, each factor having three levels, will be created. The experiments will be designed to identify optimal levels, taking into account the main effects of these three factors, and also an interaction $F_1F_2$. For this interaction, the indices are $\alpha_1=1$ and $\alpha_2=1$. This interaction carries only two degrees of freedom. The other interaction based on the same factors, $F_1F_2^2$, where $\alpha_1=1$ and $\alpha_2=2$, will not be taken into account.

The two coefficients $\alpha_1$ and $\alpha_2$ are subject to the constraints previously discussed. First, since at least two coefficients must have non-zero values, and there are only two coefficients, they are both non-zero. Second, the lowest non-zero coefficient, $\alpha_1$, has the value 1.

The resultant orthogonal array is as shown in FIG. 5A. This orthogonal array is produced as follows: The input parameters (step 12) are $m_1=1$, $m_2=3$, $m_3=2$, $m_4=1$, and $p=3$. k is provisionally set to $m_3=2$ (step 14). In the test of expression (3) in step 16, it is found that $$\frac{3^2-1}{3-1}=4 \geq m_1+m_2+m_3+1+3+2=6,$$

which is not true. That is, the inequality of expression (3) is not satisfied.

Accordingly, step 18 is executed, to determine the value of k using expression (4), as follows:

$$k \geq \log_3((1+2+1)\times(3-1)+1)=\log_3(((4)\times2)+1)=\log_3(9)=2.$$

Therefore, $k=m_3=2$ satisfies expression (4), even though it did not satisfy expression (3). The number of experiments, i.e., rows, in the orthogonal array equals $3^2=9$ (step 20).

Since $k=m_3=2$, the first $m_3=2$ columns are assigned to the factors $F_1$ and $F_2$ which are involved in the interaction, and a complete set of permutations is generated. The result is as shown in the first two columns of the array of FIG. 5A.

Next, it is determined which sets of coefficients $\alpha_i$ may and may not be used for the remaining factor $F_3$. The interaction is $F_1F_2$. The indices for this interaction are $\alpha_1$ 32 1 and $\alpha_2=1$. Therefore, this set of coefficients cannot be used to generate the level vector for the factor $F_3$. The next set of coefficients tried are $\alpha_1=1$ and $\alpha_2=2$. This set of coefficients does not match the interaction indices. Accordingly, the levels for the factor $F_3$ are calculated using expression (2) and these coefficients. The resultant values for the levels are given in the last column of FIG. 5A. No other factors are left, so the orthogonal array is finished.

Another example of an orthogonal array produced by the method according to the invention is shown in FIG. 5B. The experiments designed in this case are based on a process having three factors, $F_1$, $F_2$, and $F_3$. Each of the factors has three levels, i.e., p=3. In this case, two interactions, $F_1F_2$ and $F_1F_3$, are to be taken into account in determining the optimal levels. Thus, $m_1=2$, $m_2=3$, $m_3$ also=3, and $m_4=0$.

In step 16 of FIG. 4A, $k=m_3=3$ is used to determine whether the inequality of expression (3) is met, as follows:

$$\frac{3^3-1}{3-1}=\frac{26}{2}=13 \geq (2+3+3)=8$$

This inequality is satisfied, so it is determined that k=3, and step 18 of FIG. 4A is bypassed.

The number of experiments is determined in step 20 as $3^3=27$. In step 24, a complete set of permutations for the three factors involved in the interactions is designed. As it happens, in this example, all of the factors are involved in the interactions. Galois field theory requires that, in effect, a complete set of permutations for all of the levels of all of the factors is required to identify the optimal levels for the factors, when the two interactions given above are taken into account. As a result, the orthogonal array shown in FIG. 5B is produced.

If the orthogonal arrays of FIGS. 5A and 5B are compared, along with the factors and interactions which are to be taken into account in designing the respective sets of experiments, it will be seen intuitively that the additional interaction in the second example places a greater constraint on the optimal levels for the process, and therefore requires a larger number of experiments. This intuition translates into theory in expressions (3) and (4), in that $m_1$, the number of interactions, and $m_3$, the number of factors involved in the interactions, both increase from the first example to the second. Therefore, the value of k must be greater to satisfy either expression (3) or expression (4) in the second example, than it would be in the first example.

The orthogonal arrays produced in FIGS. 5A and 5B have columns for the three factors in each respective case. However, in neither case does the orthogonal array include a column for the interaction. In an alternative embodiment of the invention, an orthogonal array can include additional columns for interactions, as well as the columns for the factors. Level symbols can be generated for the columns devoted to the interactions by using coefficients corresponding to the indices of the interaction, i.e., the coefficients that were not used for calculating levels for the remaining factors.

An example of such an orthogonal array is shown in FIG. 6. This orthogonal array defines a set of experiments for a magnetic head design and manufacturing process. This process has eight factors with three levels each. The eight factors are designated A, B, C, D, E, F, G, and H. FIG. 7 is a table of the factors, giving their names and units of measure, and the three levels, given quantitatively, which correspond with the level symbols 1, 2, and 3.

In this example, the interactions AB, $AB^2$, AC, BC, and ABC are to be considered. Thus, $m_1=5$, $m_2=8$, $m_3=3$, $m_4=5$, and p=3.

Step 16 is executed to determine whether, for these values, expression (3) is satisfied for $k=m_3$.

$$\frac{3^3-1}{3-1}=13 \geq 5+8+3=16$$

Since 13 is not greater than or equal to 16, expression (3) is not satisfied for $k=m_3$. The value of k is thus set in accordance with expression (4) in step 18, as follows:

$$\log_3((5+3+5)\times(3-1)+1)=\log_3(13\times2+1)=\log_3(27)=3$$

Since expression (4) produces an integer, the smallest integer greater than or equal to it is the integer itself. Thus, k is set to 3 based on expression (4), even though the same value for k did not satisfy expression (3). Therefore the orthogonal array (FIG. 6) defines $3^3=27$ experiments, a valid Galois field is produced, and 27 experiments is sufficient to determine the desired optimal levels for the factors of the industrial process.

The number of columns in the orthogonal array of FIG. 6, unlike that of FIG. 5, includes five for the interactions, as well as eight for the actors. The factors A, B, and C are included in the interactions, so a complete set of permutations of levels is created for these three factors (step 24). For the five interactions, sets of levels are shown based on the indices which define those interactions. For the remaining five factors, D, E, F, G, and H, the levels are computed based on the levels of A, B, and C according to expression (2) (step 30). The remaining valid sets of coefficients are used to calculate these levels (determined in steps 26 and 28). Along the bottom of FIG. 6, the respective indices which were used to compute the levels are shown. For the five interactions, coefficients in accordance with the interaction indices were used. For the five remaining factors, other valid sets of indices (i.e., at least two non-zero, and the first non-zero index equaling one) are shown.

Unlike the orthogonal array of FIG. 5, the three factors involved in the interactions and the five factors not so involved are not segregated into groups of consecutive columns. Rather, the columns showing the interactions are interspersed between certain ones of the columns assigned to the factors. This is because, when the indices of the interactions are used as the coefficients in expression (2), the coefficients and the columns to which the factors involved in the interactions are assigned have mathematical relationships which can be used to calculate the number of a column for that interaction's level symbols.

From the foregoing description of the preferred embodiments of the invention, a skilled programmer would be able to generate code for executing the methods of the invention. The methods of the invention have been implemented in APL software as shown in FIG. 8. Other implementations, including implementations in other computer languages, may also be made within the spirit and scope of the invention.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for optimizing an industrial process comprising the steps of:

operating a digital data processor to build a machine-readable table structure in a memory coupled to the data processor to determine a minimum number of experiments necessary to identify optimal levels for the factors in the industrial process, said table structure comprising an orthogonal array in which each experiment has a combination of levels, including a selected level for each of the factors;

performing the experiments specified by the table structure by running experimental runs of the industrial process, each experimental run being based on one of the plurality of combinations of levels for the factors, to produce a plurality of experimental results; and using the experimental results to identify optimal levels for the factors such that the industrial process using the optimal factors produces optimal results.

2. A method as recited in claim 1, wherein the operating the operating step includes:

dividing the factors into first and second groups based on a required number of experiments, and selecting a plurality of combinations of levels for the factors, the step of selecting including (i) selecting all possible permutations of levels for the first group of factors, and (ii) for each combination, selecting levels for each of the factors of the second group based on the levels selected for the first group of factors.

3. A method as recited in claim 2, wherein the step of selecting includes selecting combinations of a number p of levels for each factor, p being a prime number, whereby the plurality of combinations of levels form a valid Galois field, and, for each factor, the selected levels form a vector, the vectors for all of the factors being orthogonal to each other.

4. A method as recited in claim 3, wherein:

the first group of factors includes k factors and the second group includes m–k factors, m being the total number of factors and k being a positive integer less than m; and the step of dividing includes setting k equal to the smallest integer which satisfies the inequality $k \geq \log_p[m(p-1)+1]$.

5. A method as recited in claim 2 wherein the step of selecting combinations includes:

assigning level symbols to the levels of each factor of the first and second groups of factors; and for each combination, selecting levels for the second group of factors by determining the level symbols assigned to each of the levels for the second group of factors based on the level symbols assigned to the levels for the first group of factors.

6. A method as recited in claim 5, wherein:

the step of selecting includes selecting combinations of a number p of levels for each factor, p being a prime number;

the step of assigning level symbols includes assigning consecutive integers 0 through p–1 to the levels of each factor of the first and second groups of factors; and the step of selecting levels for the second group of factors for each combination includes calculating the integers assigned to the levels for the second group of factors, based on the integers assigned to the selected levels for the first group of factors, using modulo p arithmetic.

7. A method as recited in claim 6, wherein:

the step of dividing includes dividing the factors into a first group including k factors and a second group including m–k factors, m being the total number of factors and k being a positive integer less than m; and the step of selecting levels for the second group of factors includes, for each combination, selecting the level for each of the second group of factors by calculating the integer $C_j$ for the J-th Factor of the second group of factors, where $k+1 \leq J \leq m$, according to the formula $$C_J = \sum_{i=1}^{U} \alpha_i C_{I_i}$$

where $C_{I_i}$ is the integer assigned to the level of the i-th one of the first factors $C_I$, $\alpha_i$ is an integral coefficient associated with the i-th one of the first factors and having a value from 0 to p–1, and U is an integer having a value from 2 to k, the values of U and $\alpha_i$ being variable over the combinations.

8. A method as recited in claim 6, wherein:

interactions between factors in the process are defined in terms of combinations of factors and respective indices associated with the factors making up the combinations;

at least one interaction is to be taken into account in the selection of optimal levels for the factors;

the step of dividing includes assigning all factors involved in the at least one interaction to the first group of factors; and the step of selecting levels for the second group of factors for each combination includes calculating the integers assigned to the levels for the second group of factors, based on the integers assigned to the selected levels for the first group of factors, and on the indices of the interactions, using modulo p arithmetic.

9. A method as recited in claim 8, wherein the step of dividing includes: determining whether $$\frac{p^{m_3} - 1}{p - 1} \geq m_1 + m_2 + m_3$$

$m_1$ being the total number of interactions, $m_2$ being the total number of factors, $m_3$ being the number of factors involved in the interactions, and $m_4$ being the number of factors not involved in the interactions;

if so, then setting k equal to $m_3$;

if not, then setting k equal to the smallest integer greater than or equal to $m_3$ which satisfies the inequality $k \geq \log_p[(m_1+m_3+m_4)(p-1)+1]$.

10. A method as recited in claim 8, wherein the step of selecting combinations includes:

assigning level symbols to the levels of each of the first and second factors; and for each combination, selecting levels for the second factors by calculating the level symbols assigned to the levels for the second factors based on the level symbols assigned to the levels for the first factors.

11. A method as recited in claim 10, wherein the step of dividing includes:

assigning the factors included in the at least one interaction to the first group of factors, if $k=m_3$; and (i) assigning the $m_3$ factors included in the at least one interaction to the first group of factors, and (ii) assigning $k-m_3$ of the factors not included in the at least one interaction to the first group of factors, if $k>m_3$.

12. A method as recited in claim 11, wherein the step of selecting for each combination includes:

selecting the level for each of the second factors by calculating the integer $C_J$ for the J-th one of the second factors, where $k+1 \leq j \leq m$ according to the formula $$C_J = \sum_{i=1}^{U} \alpha_i C_{l_i}$$

where $C_{l_i}$ is the integer assigned to the level of the i-th one of the first factors $C_l$, $\alpha_i$ is an integral coefficient associated with the i-th one of the first factors and having a value from 0 to p−1, and U is an integer having a value from 2 to $m_3$, and the step of calculating is performed using values of $\alpha_i$ which do not correspond with the indices associated with factors making up the interactions.

13. A processing apparatus for optimizing an industrial process, the apparatus comprising:

a memory;

a data processor coupled to the memory in program to perform method steps to facilitate the selection of optimal levels for factors in an industrial process, said method steps comprising;

building a machine-readable table structure in the memory to determine a minimum number of experiments necessary to identify optimal levels for the factors in the industrial process, said table structure comprising an orthogonal array in which each experiment has a combination of levels, including a selected level for each of the factors;

receiving experimental results of experimental runs, the experimental runs having been performed by running the industrial process, each experimental run being based on one of the plurality of combinations of levels for the factors, to produce a plurality of experimental results;

using the experimental results to identify optimal levels for the factors such that the industrial process using the optimal factors produces optimal results.

14. An apparatus as recited in claim 13, wherein the data processor is programmed such that the building step includes the steps of:

dividing the factors into first and second groups based on a required number of experiments, and selecting a plurality of combinations of levels for the factors by (i) selecting all possible permutations of levels for the first group of factors, and (ii) for each combination, selecting levels for each of the factors of the second group based on the levels selected for the first group of factors.

15. An apparatus as recited in claim, 14 wherein the data processor is programmed such that the selecting step includes the steps of selecting combinations of a number p of levels for each factor, p being a prime number, whereby the plurality of combinations of levels form a valid Galois field, and, for each factor, the selected levels form a vector, the vectors for all of the factors being orthogonal to each other.

16. An apparatus as recited in claim 15, wherein the data processor is programmed such that:

the first group of factors includes k factors and the second group includes m−k factors, m being the total number of factors and k being a positive integer less than m; and the dividing step includes the steps of setting k equal to the smallest integer which satisfies the inequality $k \geq \log_p[m(p-1)+1]$.

17. An apparatus as recited in claim 14, wherein the data processor is programmed such that the selecting step includes the steps of:

assigning level symbols to the levels of each factor of the first and second groups of factors; and selecting, for each combination, levels for the second group of factors by determining the level symbols assigned to each of the levels for the second group of factors based on the level symbols assigned to the levels for the first group of factors.

18. An apparatus as recited in claim 17, wherein the data processor is programmed such that:

the step of selecting includes a step of selecting combinations of a number p of levels for each factor, p being a prime number;

the step of assigning level symbols includes the step of assigning consecutive integers 0 through p−1 to the levels of each factor of the first and second groups of factors; and the step of selecting levels for the second group of factors for each combination includes the steps of calculating the integers assigned to the levels for the second group of factors, based on the integers assigned to the selected levels for the first group of factors, using modulo p arithmetic.

19. An apparatus as recited in claim 18, wherein the data processor is programmed such that:

the dividing step includes the steps of dividing the factors into a first group including k factors and a second group including m−k factors, m being the total number of factors and k being a positive integer less than m; and the step of selecting levels for the second group of factors includes the steps of selecting, for each combination, the level for each of the second group of factors by calculating the integer $C_j$ for the J-th factor of the second group of factors, where $k+1 \leq J \leq m$, according to the formula $$C_J = \sum_{i=1}^{U} \alpha_i C_{l_i}$$

where $C_{l_i}$ is the integer assigned to the level of the i-th one of the first factors $C_l$, $\alpha_i$ is an integral coefficient associated with the i-th one of the first factors and having a value from 0 to p−1, and U is an integer having a value from 2 to k, the values of U and $\alpha_i$ being variable over the combinations.

20. An apparatus as recited in claim 18, wherein the data processor is programmed such that:

interactions between factors in the process are defined in terms of combinations of factors and respective indices associated with the factors making up the combinations;

at least one interaction is to be taken into account in the selection of the optimal levels for the factors;

the dividing step includes the steps of assigning all factors involved in the at least one interaction to the first group of factors; and the step of selecting levels for the second group of factors for each combination includes the steps of calculating the integers assigned to the levels for the second group of factors, based on the integers assigned to the selected levels for the first group of factors, and on the indices of the interactions, using modulo p arithmetic.

21. An apparatus as recited in claim 20, wherein the data processor is programmed such that the step of dividing includes the steps of:

determining whether $$\frac{p^{m_3}-1}{p-1} \geq m_1 + m_2 + m_3$$

$m_1$ being the total number of interactions, $m_2$ being the total number of factors, $m_3$ being the number of factors involved in the interactions, and $m_4$ being the number of factors not involved in the interactions;

if so, then setting k equal to $m_3$;

if not, then setting k equal to the smallest integer greater than or equal to $m_3$ which satisfies the inequality $$k \geq \log_p[(m_1+m_3+m_4)(p-1)+1]$$

22. An apparatus as recited in claim 20, wherein the data processor is programmed such that the step of selecting combinations includes the steps of:

assigning level symbols to the levels of each of the first and second factors; and selecting, for each combination, levels for the second factors by calculating the level symbols assigned to the levels for the second factors based on the level symbols assigned to the levels for the first factors.

23. An apparatus as recited in claim 22, wherein the data processor is programmed such that the step of dividing includes:

the steps of assigning the factors included in the at least one interaction to the first group of factors, if $k=m_3$; and the steps of:
(i) assigning the $m_3$ factors included in the at least one interaction to the first group of factors and
(ii) assigning $k-m_3$ of the factors not included in the at least one interaction to the first group of factors, if $k>m_3$.

24. An apparatus as recited in claim 23, wherein the step of selecting for each combination includes the steps of:

selecting the level for each of the second factors by calculating the integer $C_j$ for the J-th one of the second factors, where $k+1 \leq J \leq m$, according to the formula $$C_J = \sum_{i=1}^{U} \alpha_i C_{I_i}$$

where $C_{I_i}$ is the integer assigned to the level of the i-th one of the first factors $C_I$, $\alpha_i$ is an integral coefficient associated with the i-th one of the first factors and having a value from 0 to p−1, and U is an integer having a value from 2 to $m_3$, and the step of calculating is performed using values of $\alpha_i$ which do not correspond with the indices associated with factors making up the interactions.

25. A machine-readable program storage device for use with a data processing system and tangibly embodying a program of instruction to perform method steps to optimize an industrial process, said method steps comprising:

directing the data processing system to build a machine-readable table structure in a memory coupled to the data processing system to determine a minimum number of experiments necessary in order to identify optimal levels for the factors in the industrial process, said table structure comprising an orthogonal array in which each experiment has a combination of levels, including a selected level for each of the factors;

directing the processing system to receive results of the experiments specified by the table structure, the experiments having been performed by running experimental runs of the industrial process, each experimental run being based on one of the plurality of combinations of levels for the factors, to produce a plurality of experimental results received by the processing system; and directing the data processing system to use the experimental results to identify optimal levels for the factors such that the industrial process performed using the optimal factors produces optimal results.

26. A device as recited in claim 25, wherein:

the the step of directing to determine includes:

the steps of directing the data processing system to divide the factors into first and second groups based on a required number of experiments, and the steps of directing the data processing system to select a plurality of combinations of levels for the factors, including (i) directing the data processing system to select all possible permutations of levels for the first group of factors, and (ii) directing the data processing system to select, for each combination, levels for each of the factors of the second group based on the levels selected for the first group of factors;

whereby a plurality of industrial process experiments may be performed using the levels selected by the step of directing to select, each experiment being based on one of the plurality of combinations of levels for the factors, to produce a plurality of experimental results from which combinations of levels which produce optimum results can be identified.

27. A device as recited in claim 26, wherein the step of directing to select include the steps of directing the data processing system to select combinations of a number p of levels for each factor, p being a prime number, whereby the plurality of combinations of levels form a valid Galois field, and, for each factor, the selected levels form a vector, the vectors for all of the factors being orthogonal to each other.

28. A device as recited in claim 27, wherein:

the first group of factors includes k factors and the second group includes m−k factors, m being the total number of factors and k being a positive integer less than m; and the step of directing to divide includes the steps of directing the data processing system to set k equal to the smallest integer which satisfies the inequality $$k \geq \log_p[m(p-1)+1].$$

29. A device as recited in claim 26, wherein the step of directing to select combinations includes the steps of:

directing the data processing system to assign level symbols to the levels of each factor of the first and second groups of factors; and directing the data processing system to select, for each combination, levels for the second group of factors by determining the level symbols assigned to each of the levels for the second group of factors based on the level symbols assigned to the levels for the first group of factors.

30. A device as recited in claim 29, wherein:

the step of selecting includes the steps of directing the data processing system to select combinations of a number p of levels for each factor p being a prime number;

the steps of directing to assign level symbols includes the steps of directing the data processing system to assign consecutive integers 0 through p–1 to the levels of each factor of the first and second groups of factors; and the step of directing to select levels for the second group of factors for each combination includes the steps of directing the data processing system to calculate the integers assigned to the levels for the second group of factors, based on the integers assigned to the selected levels for the first group of factors, using modulo p arithmetic.

31. A device as recited in claim 30, wherein:

the step of directing to divide includes steps of directing the data processing system to divide the factors into a first group including k factors and a second group including m–k factors, m being the total number of factors and k being a positive integer less than m; and the steps of directing to select levels for the second group of factors includes the steps of directing the data processing system to select, for each combination, the level the each of the second group of factors by calculating the integer $C_J$ for the J-th factor of the second group of factors, where $k+1 \leq J \leq m$, according to the formula $$C_J = \sum_{i=1}^{U} \alpha_i C_{I_i}$$

where $C_{I_i}$ is the integer assigned to the level of the i-th one of the first factors $C_I$, $\alpha_i$ is an integral coefficient associated with the i-th one of the first factors and having a value from 0 to p–1, and U is an integer having a value from 2 to k, the values of U and $\alpha_i$ being variable over the combinations.

32. A device as recited in claim 30, wherein:

interactions between factors in the process are defined in terms of combinations of factors and respective indices associated with the factors making up the combinations;

at least one interaction is to be taken into account in the selection of the optimal levels for the factors:

the steps of directing to divide includes the steps of directing the data processing system to assign all factors involved in the at least one interaction to the first group of factors; and the steps of directing to select levels for the second group of factors for each combination includes the steps of directing the data processing system to calculate the integers assigned to the levels for the second group of factors, based on the integers assigned to the selected levels for the first group of factors, and on the indices of the interactions, using modulo p arithmetic.

33. A device as recited in claim 32, wherein the steps of directing to divide includes the steps of:

directing the data processing system to determine whether $$\frac{p^{m_3} - 1}{p - 1} \geq m_1 + m_2 + m_3$$

$m_1$ being the total number of interactions, $m_2$ being the total number of factors, $m_3$ being the number of factors involved in the interactions, and $m_4$ being the number of factors not involved in the interactions;

if so, then setting k equal to $m_3$;

if not, then setting k equal to the smallest integer greater than or equal to $m_3$ which satisfies the inequality $$k \geq \log_p[(m_1+m_3+m_4)(p-1)+1].$$

34. A device as recited in claim 32, wherein the the steps of directing to select combinations include the steps of:

directing the data processing system to assign level symbols to the levels of each of the first and second factors; and directing the data processing system to select, for each combination, levels for the second factors by calculating the level symbols assigned to the levels for the second factors based on the level symbols assigned to the levels for the first factors.

35. A device as recited in claim 34, wherein:

the steps of directing to divide includes the steps of directing the data processing system to assign the factors included in the at least one interaction to the first group of factors when $k=m_3$; and the steps of directing to divide includes:
the steps of directing the data processing system to:
(i) assign the $m_3$ factors included in the at least one interaction to the first group of factors, and
(ii) assign $k-m_3$ of the factors not included in the at least one interaction to the first group of factors, when $k>m_3$.

36. A device as recited in claim 35, wherein the steps of directing to select for each combination includes the steps of:

directing the data processing system to select the level for each of the second factors by calculating the integer $C_j$ for the J-th factor of the second factors, where $k+1 \leq J \leq m$ according to the formula $$C_J = \sum_{i=1}^{U} \alpha_i C_{I_i}$$

where $C_{I_i}$ is the integer assigned to the level of the i-th one of the first factors $C_I$, $\alpha_i$ is an integral coefficient associated with the i-th one of the first factors and having a value from 0 to p–1, and U is an integer having a value from 2 to $m_3$, and the step of calculating is performed using values of $\alpha_i$ which do not correspond with the indices associated with factors making up the interactions.

* * * * *